United States Patent
Carpenter et al.

(10) Patent No.: US 9,085,424 B2
(45) Date of Patent: Jul. 21, 2015

(54) EXTENDIBLE CONVEYOR AND PARCEL HANDLING SYSTEM

(71) Applicant: Siemens Industry, Inc., Alpharetta, GA (US)

(72) Inventors: Michael D. Carpenter, Arlington, TX (US); Jeffrey Eugene Gilb, Arlington, TX (US); James M. Pippin, Keller, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 0 days.

(21) Appl. No.: 14/268,023

(22) Filed: May 2, 2014

(65) Prior Publication Data

US 2014/0326580 A1    Nov. 6, 2014

Related U.S. Application Data

(60) Provisional application No. 61/819,015, filed on May 3, 2013.

(51) Int. Cl.
| | |
|---|---|
| *G06F 7/70* | (2006.01) |
| *B65G 15/26* | (2006.01) |
| *B65G 67/08* | (2006.01) |
| *B65G 21/14* | (2006.01) |

(52) U.S. Cl.
CPC ............... *B65G 67/08* (2013.01); *B65G 21/14* (2013.01); *B65G 2203/044* (2013.01)

(58) Field of Classification Search
USPC ............... 198/587, 588, 607, 810.01, 810.03, 198/812; 414/395; 340/676; 348/135, 152; 700/62, 65, 230; 701/2, 50
See application file for complete search history.

(56) References Cited

U.S. PATENT DOCUMENTS

| | | | | |
|---|---|---|---|---|
| 4,146,924 | A * | 3/1979 | Birk et al. | 700/259 |
| 5,403,142 | A * | 4/1995 | Stewart | 414/392 |
| 5,642,803 | A * | 7/1997 | Tanaka | 198/535 |
| 5,685,416 | A * | 11/1997 | Bonnet | 198/812 |
| 5,697,753 | A * | 12/1997 | Aurora et al. | 414/398 |
| 6,006,893 | A * | 12/1999 | Gilmore et al. | 198/588 |
| 6,097,425 | A * | 8/2000 | Behnke et al. | 348/89 |
| 7,034,666 | B2 * | 4/2006 | Knutson | 340/431 |
| 7,108,125 | B2 * | 9/2006 | Gilmore et al. | 198/812 |
| 7,404,556 | B2 * | 7/2008 | Allen et al. | 271/201 |
| 7,768,549 | B2 * | 8/2010 | Cofer | 348/152 |
| 7,983,821 | B2 * | 7/2011 | Reeves | 701/50 |
| 8,381,900 | B1 * | 2/2013 | Hoogestraat | 198/588 |
| 8,622,199 | B2 * | 1/2014 | Windfeld et al. | 198/588 |
| 8,662,291 | B2 * | 3/2014 | Henderson | 198/812 |
| 8,714,334 | B2 * | 5/2014 | Yang et al. | 193/35 TE |
| 8,944,239 | B2 * | 2/2015 | Campbell et al. | 198/588 |
| 2002/0090281 | A1 * | 7/2002 | Siebenga | |

* cited by examiner

*Primary Examiner* — Douglas Hess

(57) ABSTRACT

An extendable boom conveyor system having a first boom element, a controller, an input device, and a second boom element. The controller, using the input device, can adjust the position of the first boom element to maintain a distance relative to a user. A method performed by an extendible conveyor system can include detecting a position of a user using the input device, moving the first boom element to a position relative to the position of the user, detecting a user input using the input device, moving the first boom element to a new position according to the user input, and transporting parcels loaded by the user on the conveying surfaces.

19 Claims, 4 Drawing Sheets

US 9,085,424 B2

EXTENDIBLE CONVEYOR AND PARCEL HANDLING SYSTEM

CROSS-REFERENCE TO RELATED APPLICATION

This application claims the benefit of the filing date of U.S. Provisional Patent Application 61/819,015, filed May 3, 2013, which is hereby incorporated by reference.

TECHNICAL FIELD

The present disclosure is directed, in general, to system and methods for package parcel handling, inspection, risk evaluation, and otherwise.

BACKGROUND OF THE DISCLOSURE

Improved and more efficient systems for unloading parcels and other items from a container or trailer are desirable, as is proper analysis and evaluation of work processes.

SUMMARY OF THE DISCLOSURE

Various disclosed embodiments include an extendable boom conveyor system and method. In one embodiment, an extendable boom includes first and second boom elements, each with a drive mechanism and a control system. The boom elements can be configured to "follow" an operator during unloading operations to maintain a desired distance from the operator.

Various embodiments also include a system and method for the hands-free and automatic control of an extendible conveyor, a device commonly used in the loading and unloading of containers and trailers, resulting in significantly improved productivity and safety. Also, a means of monitoring productive and safe work practices in package and parcel handling and processing.

Various embodiments include an extendable boom conveyor system having a first boom element, a controller, an input device, and a second boom element. The controller, using the input device, can adjust the position of the first boom element to maintain a distance relative to a user. A method performed by an extendible conveyor system can include detecting a position of a user using the input device, moving the first boom element to a position relative to the position of the user, detecting a user input using the input device, moving the first boom element to a new position according to the user input, and transporting parcels loaded by the user on the conveying surfaces.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
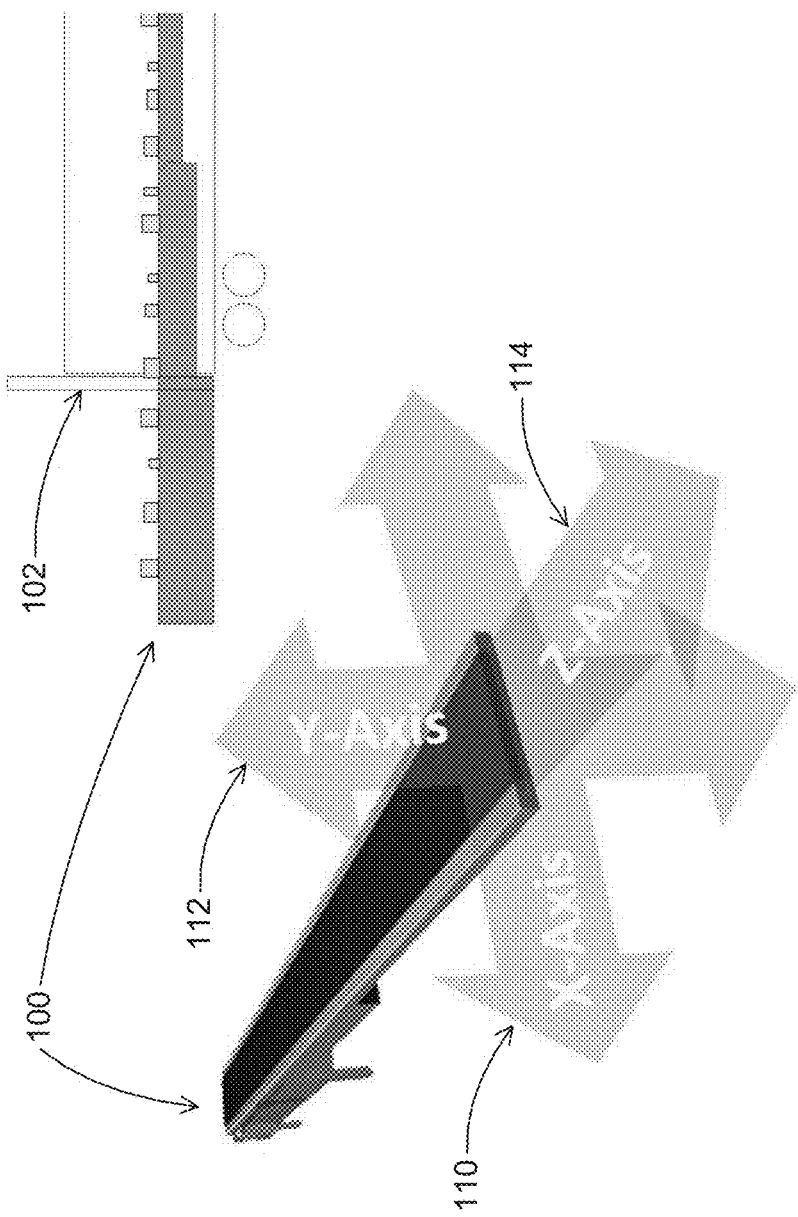
FIG. 1 illustrates an extendible conveyor in two views to show the axes of movement of the conveyor according to disclosed embodiments.

The figures discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Extendable loaders are often implemented at loading docks for trucks, trailers or the like. Some extendable loaders (referred to as "gravity loaders") are extendable into a truck/trailer or other container and angled downward such that gravitational forces cause packages to move down the loaders along a plurality of rollers. Other extendable loaders include a powered conveyor belt or other transport mechanism, which may be used to move packages into or out of a container.

The loaders may be extended to reach further into the trailer, in order to minimize the manual lifting and carrying of the packages, and retracted to a stored position to minimize the space taken up by the loader when not in use. However, because of the substantial size and weight of these loaders, extension and retraction is often accomplished by powered extension and retraction systems, which are typically complicated and expensive devices. The powered extension and retraction systems are often used to stop and hold the loader at the desired degree of extension. In other loaders, devices are arranged to apply additional friction to sliding or rolling elements of the loader in order to resist extension of the loader or to lock the loader in its current position.

Organizations that operate their own logistic systems, such as delivery services and major retailers, rely on the transportation and distribution of parcels and package goods in shipping containers and trailers. Other companies provide logistic-related services to their customers that involve the same activities. As comingled items with a plurality of ultimate destinations move through the logistic network, they are distributed, aggregated, and transported, through a process whereby individual items with common destinations are ultimately batched, transported, and delivered together. In this process, the items tend to be loaded and unloaded multiple times.

Different measures exist that characterize the efficiency of loading and unloading. For example, efficiency of labor may be optimal in a nested container model, in which the trailer represents the largest container, into which pallets or other large containers are loaded, which may contain multiple sub-nested levels of containerization, and finally the individual items themselves. The efficiency of space is typically optimized by eliminating the nested containers of multiple destinating items, and loading the items themselves directly into the trailers, a practice commonly referred to as "bed-loading."

The labor efficiency (productivity) of loading and unloading in the bed-loading environment has been improved through the use of extendible conveyors. The principle behind these devices is to provide a telescoping interface between material being unloaded or loaded and processing systems within the plant. The most sophisticated of these extendible conveyors are belt driven, powered, and are reversible to help with either loading or unloading. The devices can provide the operator with the means to adjust at least one, or as many as three, of the three potential axes of movement for the loading point.

FIG. 1 illustrates an extendible conveyor 100 in two views to show the axes of movement of the conveyor. In this example, the X-axis 110 represents "side-to-side" motion of the end of the extendible conveyor 100, for example within the trailer 102 or container being unloaded. The Y-axis 112 represents up-and-down motion to keep the end of the extendible conveyor at a height convenient for unloading. The Z axis 114 represents the motion of the end of the extendible conveyor 110 further or less further into the trailer 102 or container being unloaded. X-axis movement can be achieved, for example, by means of a pivoting section at the tip of the boom.

Extendible conveyor solutions as disclosed herein offer the possibility to change the position of the loading/unloading tip in as many as three axes.

These extendible conveyor products can include the feature of extending or retracting (z-axis), raising or lowering (y-axis), and traversing left and right (x-axis) to optimize the productivity of the operator responsible for loading and unloading. The controls for these positions are either entirely manual, or are controlled via operator interaction, such as a switch or joystick. Dedicated or prolonged interaction with these controls reduces operator productivity.

An improved means of controlling these axes of movement as disclosed herein is hands-free, thus providing an improvement in productivity. The operator's control of the available axes of positioning does not require physical contact with the equipment and the operator can remain closer to the work at hand. One disclosed way of controlling these axes of movement is automatic, interpreting the work of the operator and positioning the conveyor boom in the ideal location to facilitate the operator's productivity. Another disclosed system features a system for positioning the tip of the conveyor with considerably improved agility and speed over the coarse, relatively slow means of positioning that is typical in current systems. Another disclosed system, as it interprets the work of the operator, can also screen the operator's methods to identify instances of unsafe or unauthorized work methods.

Figure 2:
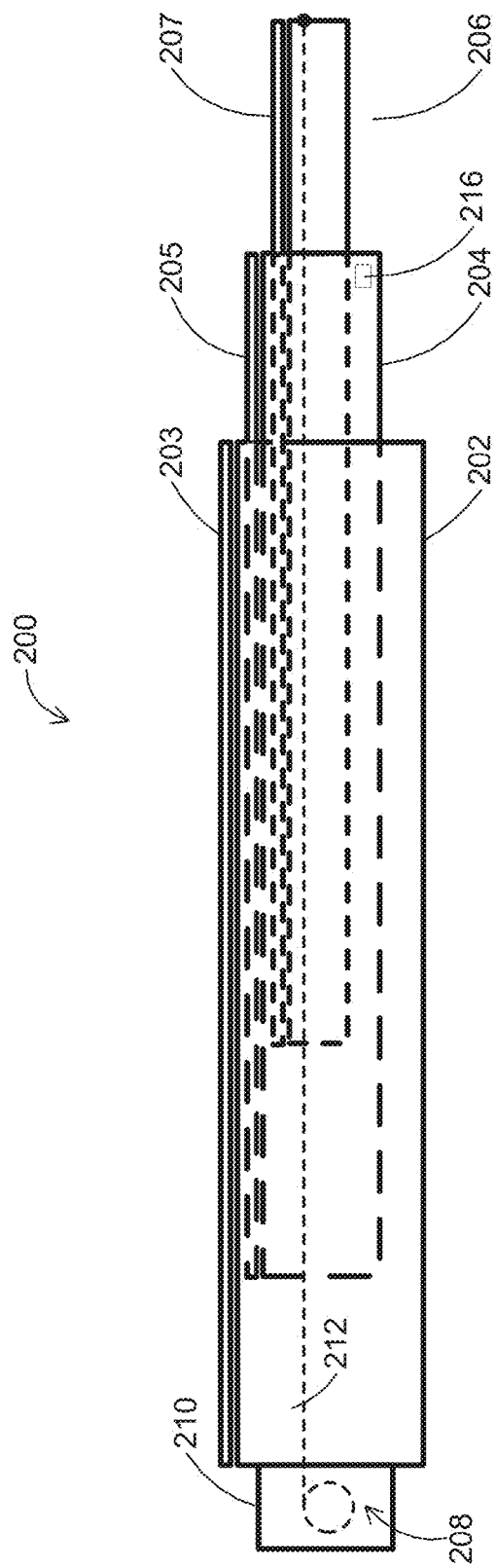
FIG. 2 illustrates a schematic diagram of an extendable boom conveyor system in accordance with disclosed embodiments.

FIG. 2 depicts a schematic diagram of an extendable boom conveyor system 200. A rear boom element 202 encloses portions of a middle boom element 204 and a front boom element 206. As shown in FIG. 2, the boom apparatus 200 is in a substantially retracted configuration, with the middle boom element 204 and the front boom element 206 substantially retracted within the rear boom 202. Conveyor apparatuses 203, 205 and 207 are included on sides of the boom elements 202, 204 and 206, respectively, such that items may pass from one to another of the conveyor apparatuses 203, 205 and 207 along the extendable boom conveyor system 200 into or out of a container. In some embodiments, the conveyor apparatuses 203, 205 and 207 include one or more of wheels, rollers, or low friction surfaces, to allow items to move by gravity into or out of a container. In other embodiments, the conveyor apparatuses 203, 205 and 207 may include one or more powered strips or belts that carry items into or out of a container. In still other embodiments, a single conveyor apparatus may extend along the upper surfaces of some or all of the boom elements 202, 204 and 206, and extend and retract along with the boom elements 202, 204 and 206. Each boom element has a conveyor surface.

Extension and retraction of the boom apparatus 200 may be accomplished by a boom drive mechanism 208, comprising a winch 210 and cable 212 extending through the rear boom element 202 and the middle boom element 204. Front boom element 206 can have a separate drive mechanism 216, described in more detail below, that can include its own controllers, sensors, actuators, and other elements, and can communicate with drive mechanism 208 or other controllers. Drive mechanism 216 can be mounted on the front boom element 206 or on the middle boom element 204.

In some embodiments, front boom element 206 can comprise a lighter-weight material than the structure of the other boom elements, so that it can be more quickly extended and retracted. Similarly, drive mechanism 216 can operate so as to extend and retract front boom element 206 more quickly and responsively than drive mechanism 208 moves the rear boom element 202 and the middle boom element 204.

In various embodiments, drive mechanism 216 can automatically extend and retract front boom element 206 to maintain a safe but efficient distance from an operator that is loading parcels onto the conveyor apparatus (referred to in the singular for simplicity, but not limited to a single conveyor apparatus). Drive mechanism 208 can then extend or retract at a slower rate to allow the middle boom element 204 to "catch up" to the position of the front boom element 206. In this way, front boom element 206 can automatically maintain the distance from the operator in a relatively quick manner, and middle boom element 204 can then be adjusted more slowly into its new position relative to the user and the front boom element 206.

Drive mechanism 216 can include, among other elements, a motor, chain, belt, emergency-stop mechanism such as a button or otherwise, manual controls for moving the front boom element 206 or other portions of the extendible boom in any direction, contact bumper switches or other safety devices, or otherwise. In particular, drive mechanism 216 can include a proximity sensor, whether optical, sonar, or otherwise, that can detect the distance from front boom element

206 to an operator, the "stack" of parcels, or other objects, for automatic control of the movement and positioning of the boom elements. Drive mechanism 216 can communicate with other controllers or drive mechanisms to control the position and movement of the other boom elements with respect to the front boom element 206.

Various technical means of locating a person, identifying and locating motion, and profiling an area exist. Infrared sensors, ultrasonic transducers, radio frequency transducers, laser-based measurement profiling, and various optical means of profiling objects in space are all example technical means. Continued innovation in these sensing technologies is expected, whereby a growing market will take advantage of improved performance and flexibility of the sensors, along with reduced cost. Disclosed embodiments can optimize the methods of controlling extendible conveyors to improve productivity, safety, and reduce damage to the items being handled, independent of particular sensing methods used.

Disclosed embodiments include hands-free control of the extendible conveyor, whereby explicit, trained motions of the operator, coupled with verbal cues, provide the means by which the operator controls the extendible conveyor.

Disclosed embodiments include automatic control of the extendible conveyor, whereby the position of items in the load and the activity of the operator are interpreted to automatically place the extendible conveyor boom in the optimal position.

Disclosed embodiments include an agile extension of the extendible boom conveyor, whereby precise and fast adjustment of the position of the loading/unloading point on the z-axes can be achieved by the control system.

Disclosed embodiments include monitoring the movements of the operator, such that unauthorized or unsafe work practices, such as throwing items or lifting in ways that tend to lead to injuries, is identified and reported.

For one skilled in the arts, various practical methodologies could be implemented according to various embodiments, using any number of input devices. For the sake of simplicity, the certain disclosed techniques will mostly be described in this document within the context of a common commercial device, the Kinect® input device.

The Kinect® input device is a motion sensing input device by Microsoft™, used with their Xbox™ gaming console and compatible with Windows™ PCs. The original market for this device had to do with improving and extending the gaming experience by eliminating the need to interact with a game controller device, but rather by interpreting complex gestures and spoken commands. In summary, the Kinect® input device offers a hands-free gaming experience. A Kinect® input device includes a multi-array microphone, three-dimensional (3D) depth sensors, and RGB camera, and a motorized tilt mechanism that tilts the angle of the camera and other sensors. Some or all of these features can be included in the input device 326 disclosed herein.

The technology behind the Kinect® input device involves "range camera" technology, facial recognition technology, voice recognition technology, and motion recognition technology. These combine to provide facial recognition, voice recognition, and gesture recognition, which are the basis of the heightened Xbox™ gaming experience. The Kinect® input device core technology, reapplied in a novel way to the control of extendible loading and unloading conveyors, offers the potential of optimizing productivity and safety on a proven mechanical platform.

The full range of the Kinect® input device technologies can be exploited in disclosed embodiments.

"Skeletal Tracking" can be used in disclosed embodiments to recognize and interpret complex gestures and motions. Up to six persons can be recognized, in some cases, and the gestures and motions of two can be interpreted. Skeletal Tracking, in various embodiments, monitors twenty flexible joints in the human body, including right and left hands, wrists, shoulders, hips, knees, ankles, and feet, and the head, shoulder center, spine, and hip center.

"Facial Recognition" is similar to skeletal tracking, but is focused on facial gestures rather than gestures of the body. Two basic functions are related to facial recognition, identifying and differentiating between multiple humans by facial features, and recognizing and tracking features to identify things such as mouth movements associated with speech or chewing, opened or closed eyes.

"Voice Recognition" identifies the location of speech and allows speech to be interpreted and associated. Voice recognition may be used for interpreting verbal commands and other spoken cues that can be used within the process to which voice recognition is employed.

"3D Scanning" provides the means of profiling the displacement and shape of objects in the environment, including the user. 3D scanning supports facial and skeletal recognition and tracking, and also allows for the size, shape, and position of objects to be identified and tracked.

Hands-free control of the extendible conveyor eliminates the need for the operator to touch conveyor controls. Most of the portion of time associated with the operator moving to the control area and interacting with the controls can be reallocated to productive work, resulting in higher productivity. Different cultural environments as well as the range of personal preferences expected among operators require a range of flexibility in hands-free controls so that multiple hands-free methods are supported simultaneously within the embodiment of the invention. These methods are based on interpreting three classes of act by the operator.

Spoken words refers to the ability recognize and respond to spoken commands and other audio user input within a pre-defined, flexible dictionary of valid commands is supported by disclosed embodiments. Multiple languages of these commands are supported by the invention, according to the dictionary. For example, "stop!" or "¡Alto!" could be defined in the dictionary as valid spoken commands to de-energize the equipment (stop the motors). The word "Irregular" or a shortened form such as "Irreg" could be a defined verbal cue from the operator to summon another operator to fetch at item that is not compatible with the extendible conveyor or downstream systems.

Specific predefined gestures are used in some embodiments as gesture user inputs. "Stop!" is a common gesture in many cultures, created by extending the arm and facing the palm of the hand forward. Pointing in another common gesture associated with controlled movement, such as pointing "up" as a gesture to raise the conveyor boom position. The library of gestures cannot be ambiguous, for example, pointing "up" and a sign for the number one must be unique from one another. The gestures themselves are ideally common sense with a cultural context, such that little or no training is involved to be able to control the conveyor with gestures.

Procedural interpretation is used in some embodiments. Certain actions of the operator are unambiguous, and could be interpreted to allow the control system to prepare itself based on the operator's movements according to common procedure. For example, if the unloading operator walks into a trailer after initially opening the trailer door, the conveyor could simply follow the operator to the position where the operator begins to unload.

Through hands-free control, the operator "leads" the conveyor, commanding the conveyor to position or initiating functionality by specific, predefined acts or utterances. On the other hand, the manner in which the system responds to the operator is to a degree automatic. For example, the height of the operator and which side of the tip of the conveyor boom the operator is standing can be the basis for the rough placement of the tip of the extendible conveyor boom, defaulting to a position in the X-axis and Y-axis that makes room for the operator to stand and work, and settling to a default height that allows operators of any height to be most productive.

Automatic control of the extendible conveyor is primarily a function through which the end of the extendible conveyor is automatically placed. Through automatic control, the position of items in the load and the activity of the operator are interpreted, and the extendible conveyor boom is automatically placed in the optimal position. Indeed, the conveyor may "lead" the operator, directing the focus of the operator by the position of the tip of the boom. This positioning is determined by measuring the space in the environment, so that the profile of the items being loaded or unloaded is known, the position of the operator(s) is known, and the position of the extendible conveyor tip is known.

In the loading operation, in some embodiments, the control system knows the size and shape of items being loaded, for example from a pre-loaded inventory. In some environments, the items are uniform in size and shape, but in parcel delivery logistics, there is typically a wider range. The control system, utilizing displacement information regarding the packages along with 3D scan data regarding the items already loaded, recognizes positions in the stack that are large enough to accommodate the next item on the boom. The tip of the extendible boom is moved to accommodate transfer of the item to the targeted position, and the operator loads the item into the trailer or container.

In the unloading operation, the tip of the extendible boom is either placed at a predetermined point to begin (default), or follows the operator's hand position to facilitate the operator's dynamically chosen unloading sequence. The position of the boom near the stack of items being loaded is optimized to support improved productivity, and can be balanced to ensure adequate package care.

There are two principles of control that may be utilized alternatively, in various embodiments, when the system is in an automatic mode (potentially two automatic modes):

The system automatically responds to operators (operator lead)

The system predetermines to a position that the operator must follow (system lead)

Certain aspects of control may be a combination of these modes. For example, even in a "system lead" situation, the system would recognize which side of the conveyor the operator is positioned, and lead within that context. Operator lead and system lead may be determined by the operator's level of experience and skill. When the operator has been identified (by facial recognition, voice recognition, both, or other common means), the system may lead inexperienced and unskilled operators, or follow operators with legitimate skill. In this way, the system leads operators that need leading, and follows true experts.

An agile extension of the extendible boom conveyor may be used, whereby precise and rapid adjustment of the Z-axis position can be achieved by the control system. This extension serves not only to lengthen the maximum extension according to the length cantilevered on the end boom, but it is able to respond much more dynamically to the requirements of the control system regarding the optimal position of the loading point than the powered extension mechanism of the common extendible conveyor. Since this extension becomes the direct interface between the operator and the extendible conveyor, its movements are made with the position and safety of the operator in mind. Such an extension can be implemented as the front boom element 206 as described herein.

Monitoring the movements of the operator is based on the skeletal tracking of operators performing work while handling packages. This is certainly an aspect of unloading and loading, but many other handling tasks may also be monitored by the invention. For example, manual sorting, manual feeding/singulation, manual labeling, and manual data entry would all benefit from monitoring the movements of the operator while handling packages and parcels.

The skeletal tracking represents the operators work motions in exact detail. Through skeletal tracking, unauthorized or unsafe work practices, such as throwing items or lifting in ways that tend to lead to injuries, is identified and fed back to the operator, by a colored illuminator or other feedback (audible indicator, graphical display, etc.) is provided as a means of helping the operator improve work practice. Work practices and safety can be reported so that management has the opportunity to control and refine these important characteristics of the operation.

Skeletal tracking is also one of the means by which also the system can properly rate the operator's performance. Typical existing means to evaluate these operators is overly focused on simple productivity, ignoring other important factors of performance such as safety, package care, and consistency. Widespread monitoring, together with corrective feedback and reporting provide the means by which users of the invention can demonstrate and prove environmental improvements that translate to the enhanced health and safety of employees.

An accelerometer may be used to measure the motion of the tip of the conveyor, to detect unsafe conditions coincident with physical interaction with the conveyor, for example as part of the input device, as an independent sensor, or otherwise. For example, since the conveyors are typically cantilevered structures that extend dozens of feet from their mounting structure, the overall structure tends to resonate with very low frequency excitation. These low frequencies can be produced through the kinetic interaction with the structure, such that applying articles of significant weight can occur at near synchronization to the natural frequency of the structure, or a harmonic thereof. When this occurs, structural ringing is realized as an oscillation of the conveyor tip, whose amplitude may grow as energy is stored with continued synchronized interaction. This oscillation may damage the equipment, or even worse, harm personnel working nearby. The accelerometer can be used to detect oscillation of the conveyor tip, to retract the conveyor tip to interrupt synchronized interaction, and in some embodiments, to sound an alarm.

Figure 3:
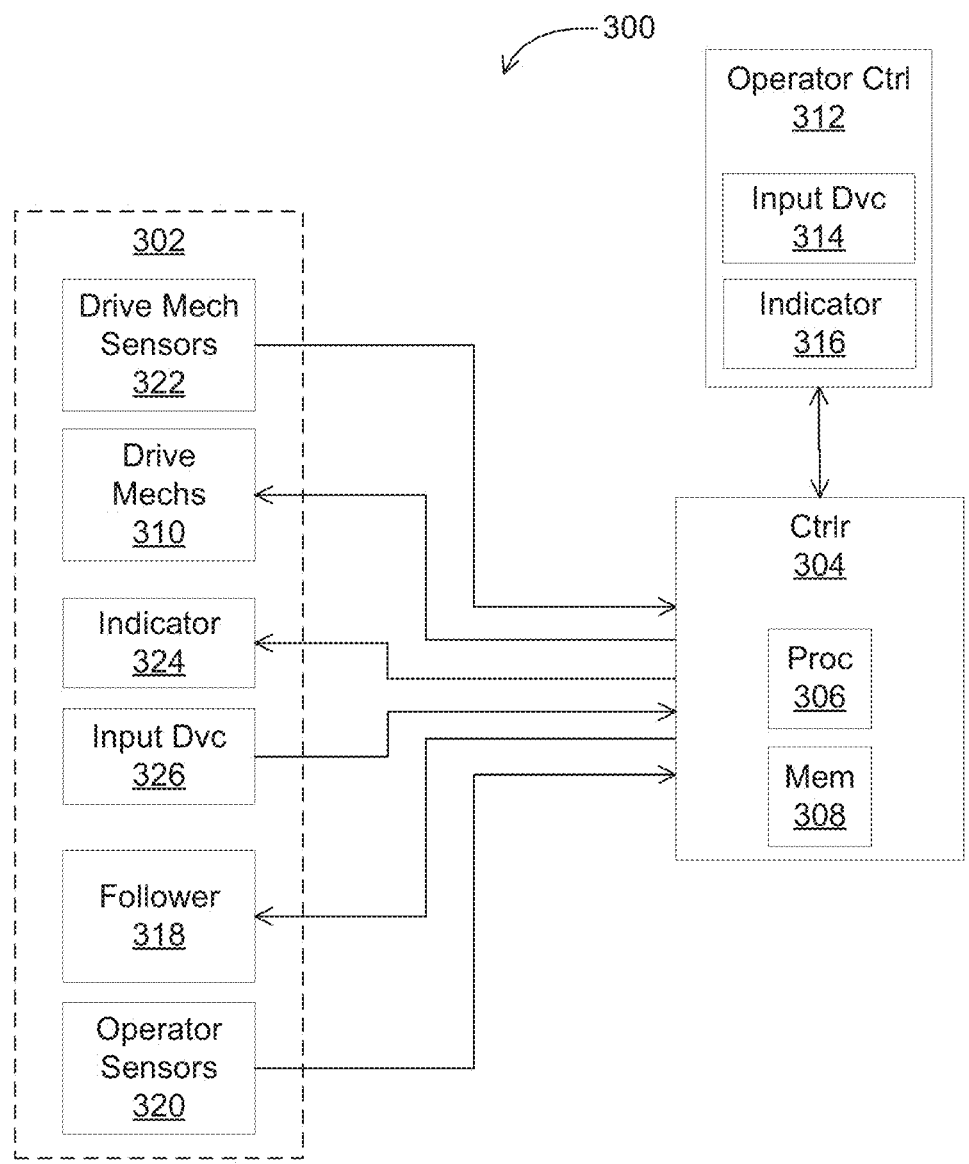
FIG. 3 illustrates a block diagram of an extendable boom system in accordance with disclosed embodiments.

FIG. 3 depicts a block diagram of an extendible conveyor system 300 in accordance with disclosed embodiments. The boom extendible conveyor system 300 includes an operator control 312, a controller 302, and an extendable boom 302.

The operator control 312 includes an input device 314 and an indicator 316. A boom operator can use the input device 314 to signal the controller 304 to extend or retract the extendable boom 302. The input device 314 may be a joystick, rocker switch, touch-sensitive screen or other suitable user interface device. The controller 304 uses the indicator 316 to signal the operator a current configuration of a follower mechanism 318 on the extendable boom 302 and/or a current condition of a drive mechanisms 310 on the extendable boom 302 (either on the main boom or on the extension/front end boom). The indicator 316 may be one or more lamps or LEDs, a character display, a graphical display, or other suitable user interface device. The extendable boom 302 also includes an input device 326 and an indicator 324, with similar functionality to the input device 314 and indicator 316. In other embodiments, either the input device 314 or the input device 326 may additionally or alternatively include a button or other suitable switch to use as a 'kill switch' to cause the controller 304 to immediately signal the drive mechanisms 310 to stop motion of the extendable boom 302.

The controller 304 includes data processing hardware such as a processor 306 and storage 308 that can include volatile memory, non-volatile memory, optical storage, magnetic storage, or other computer-readable storage media as known to those in the art. The controller 304 can be implemented using one or more physical systems, and may include multiple processors 306 or storage 308; the examples herein refer to these in the singular, but are not intended to limit the physical implementations. As described above, a separate controller can also be placed at or near the front end boom to control its separate extension/retraction and to control the subsequent extension/retraction of the other boom elements.

The extendable boom 302 includes the input device 326, the indicator 324, the drive mechanism 310, configured to extend and retract the extendable boom 302, and one or more drive mechanism sensors 322, configured to sense one or more conditions of the drive mechanism 310. The mechanism sensors 322 can include proximity sensors, a Kinect® type input device, emergency or bumper switches, encoders, or others.

The follower mechanism 318 is configured to arrest extension or retraction of the extendable boom 302. In particular, the follower mechanism can be configured to automatically extend or retract the front end boom to maintain a position or distance relative to a user or parcel(s), and to automatically extend or retract other boom elements (either subsequently or concurrently) to maintain a position or distance relative to the end of the front end boom. Preferably, the middle boom element is moved so that, while the front end boom maintains the position or distance relative to the user or parcel(s), the front end boom is approximately halfway extended from the middle boom element. This may be accomplished by, for example, simultaneously extending the middle boom and retracting the front end boom relative to each other, while leaving the end of the front end boom substantially stationary, such that the middle boom "follows" the front end boom at a slower rate than the front end boom moves.

Operator sensors 320 are configured to sense one or more operator inputs or statuses, which can include but are not limited to skeletal tracking, facial recognition, voice recognition, 3D scanning, spoken words, etc. Operator sensors 320 can be implemented using, for example Kinect® type devices as described herein. Operator sensors 320, and other elements described herein, can be mounted on, under, or near any of the extendible conveyor structures, and can be mounted on a frame or arm above or to the side of the extendible conveyor.

Figure 4:
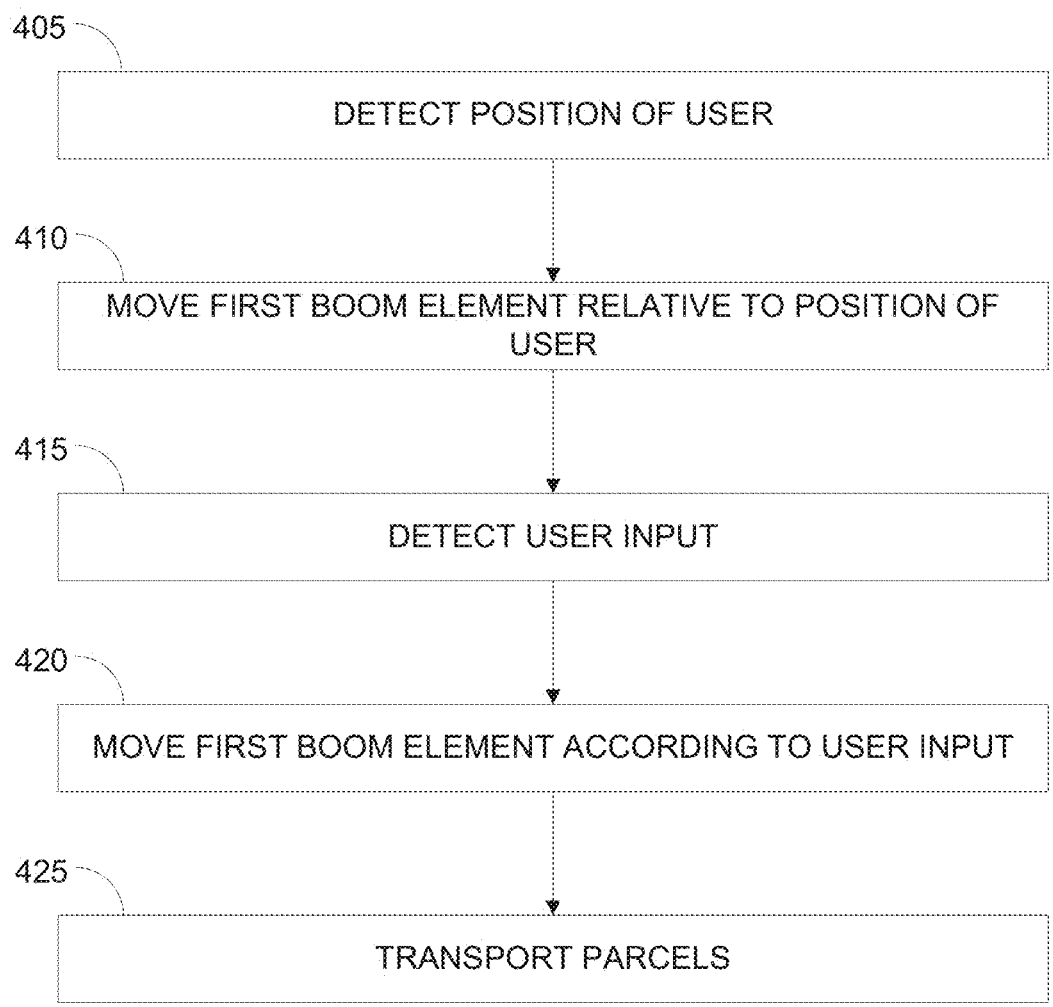
FIG. 4 illustrates a flowchart of a process in accordance with disclosed embodiments.

FIG. 4 illustrates a flowchart of a process in accordance with disclosed embodiments using an extendible conveyor as disclosed herein.

In an embodiment of this process, the extendible conveyor is assumed to be placed such that its first boom element is proximate to or inside a trailer or other container so that parcels can be unloaded from the conveyor and onto the first boom element by a user.

The extendible conveyor detects the position of the user using an input device (405). This can be accomplished by any of the sensors described herein, and in specific embodiments by an input device 326, which can include video and audio inputs, an accelerometer, or other sensors.

The extendible conveyor moves the first boom element to a position relative to the position of the user (410). This can include adjusting any of the X, Y, and Z axes, and can be performed by a follower mechanism of the extendible conveyor as disclosed herein. The initial position relative to the user can be predetermined and stored in memory 308.

The extendible conveyor dynamically detects the movement of the user using the input device and moves the first boom element accordingly, such as looping between steps 405 and 410 so that the first boom element will "follow" the user to maintain the same relative position.

While this dynamic process is occurring, the extendible conveyor can also detect a user input using the input device (415). The user input can be optical, such by the extendible conveyor using skeletal tracking, facial recognition, other user motion or position recognition, or otherwise via an optical sensor. The input can be audible, such as using voice recognition of voice commands or otherwise via an audio sensor. The input can be other manual or automatic input, such as the activation of an emergency switch, a bumper switch, a proximity sensor, or otherwise.

The extendible conveyor moves the first boom element to a new position according to the user input (420). This can include adjusting any of the X, Y, and Z axes, and can be performed by a follower mechanism of the extendible conveyor as disclosed herein. The new position can be stored in memory 308 for use as the position relative to the user in steps 405-410.

The extendible conveyor transports parcels loaded by the user on conveying surfaces of the first boom element and a second boom element (425).

Those skilled in the art will recognize that, for simplicity and clarity, the full structure and operation of all systems suitable for use with the present disclosure is not being depicted or described herein. Instead, only so much of the physical systems as is unique to the present disclosure or necessary for an understanding of the present disclosure is depicted and described. The remainder of the construction and operation of the systems disclosed herein may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs). In particular, computer readable mediums can include transitory and non-transitory mediums, unless otherwise limited in the claims appended hereto.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke 35 USC §112(f) unless the exact words "means for" are followed by a participle.

What is claimed is:

1. An extendable boom conveyor system comprising:
    a first boom element;
    a controller;
    an input device; and
    a second boom element, wherein the controller, using the input device, adjusts the position of the first boom element to maintain a distance relative to a user and continues to dynamically adjust the position of the first boom element to maintain the distance relative to the user as the user unloads parcels from a container.

2. The extendable boom conveyor system of claim 1, wherein the input device includes an optical sensor that detects a position of the user.

3. The extendable boom conveyor system of claim 1, wherein the sensor detects a hands-free user input using optical or audio sensors of the input device.

4. The extendable boom conveyor system of claim 1, wherein the controller also adjusts the position of the second boom element to maintain a position relative to the first boom element.

5. The extendable boom conveyor system of claim 1, wherein the extendable boom conveyor system also performs a skeletal tracking process.

6. The extendable boom conveyor system of claim 1, wherein the controller adjusts the position of the first boom element according to an audio user input detected by the input device.

7. The extendable boom conveyor system of claim 1, wherein the controller adjusts the position of the first boom element according to a gesture user input detected by the input device.

8. The extendable boom conveyor system of claim 1, wherein the controller adjusts the position of the first boom element according to a procedural interpretation of inputs detected by the input device.

9. The extendable boom conveyor system of claim 1, wherein the controller uses an accelerometer to detect oscillation in an end of the first boom element.

10. A method performed by an extendible conveyor system having a first boom element, a second boom element, an input device, and conveying surfaces on the first boom element and the second boom element, comprising:
    detecting a position of a user using the input device;
    moving the first boom element to a position relative to the position of the user;
    detecting a user input using the input device;
    moving the first boom element to a new position according to the user input; and
    transporting parcels loaded by the user on the conveying surfaces.

11. The method of claim 10, wherein the input device includes an optical sensor.

12. The method of claim 10, wherein the user input is a hands-free user input detected using optical or audio sensors of the input device.

13. The method of claim 10, wherein the extendible conveyor system also adjusts the position of the second boom element to maintain a position relative to the first boom element.

14. The method of claim 10, wherein the extendible conveyor system continues to dynamically move the first boom element to maintain a distance relative to a user as the user unloads parcels from a container.

15. The method of claim 10, wherein the extendable boom conveyor system also performs a skeletal tracking process.

16. The method of claim 10, wherein the user input is an audio user input detected by the input device.

17. The method of claim 10, wherein the user input is a gesture user input detected by the input device.

18. The method of claim 10, wherein the extendible conveyor system adjusts the position of the first boom element according to a procedural interpretation of inputs detected by the input device.

19. The method of claim 10, wherein the extendible conveyor system detects oscillation in an end of the first boom element using an accelerometer.

* * * * *